No. 768,077. PATENTED AUG. 23, 1904.
J. N. REYNOLDS & J. C. JENKINS.
FENCE LIGHTNING STAY.
APPLICATION FILED MAY 20, 1904.
NO MODEL.
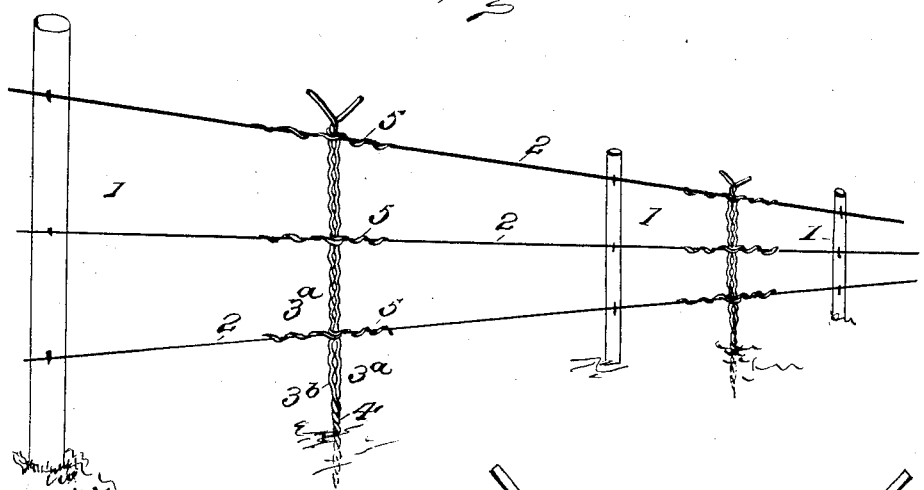
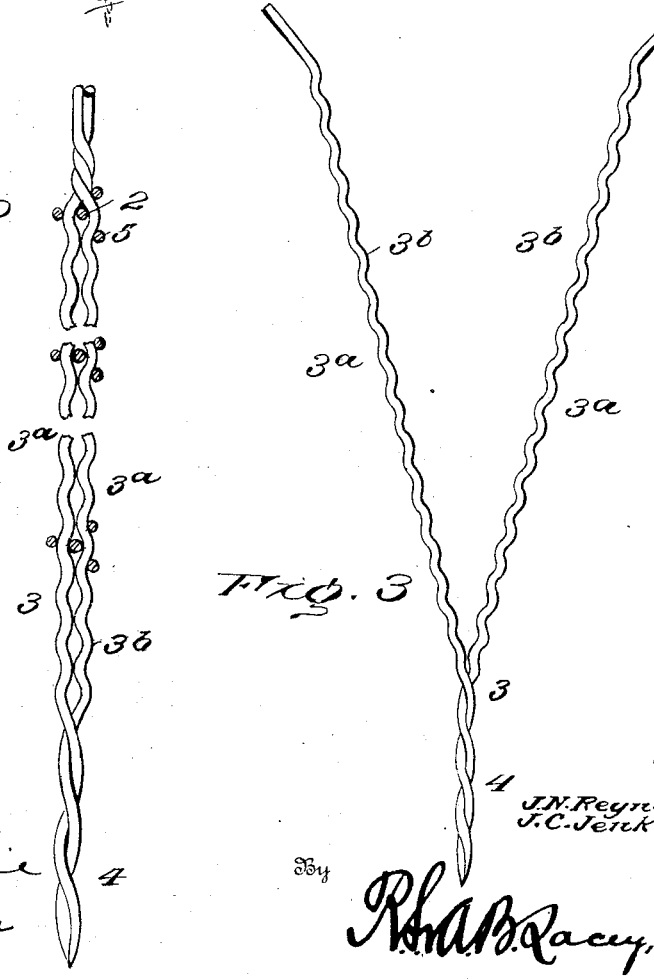

No. 768,077.

Patented August 23, 1904.

UNITED STATES PATENT OFFICE.

JOSEPH N. REYNOLDS AND JOHN C. JENKINS, OF ANITA, IOWA.

FENCE LIGHTNING-STAY.

SPECIFICATION forming part of Letters Patent No. 768,077, dated August 23, 1904.

Application filed May 20, 1904. Serial No. 208,926. (No model.)

*To all whom it may concern:*

Be it known that we, JOSEPH N. REYNOLDS and JOHN C. JENKINS, citizens of the United States, residing at Anita, in the county of Cass and State of Iowa, have invented certain new and useful Improvements in Fence Lightning-Stays, of which the following is a specification.

This invention aims to provide a simple form of stay particularly adapted for use upon wire fences, the essential feature of the invention residing in the general simplicity of the device, whereby the same may be cheaply manufactured, affording advantages as a commercial article in this respect.

In general form the stay is adapted to brace the longitudinal wires of the fences, and the lower end thereof is received in the ground, so that the invention also forms a lightning-arrester to carry off electrical charges that the fence might otherwise sustain during storm periods.

For a full description of the invention and the merits thereof and also to acquire a knowledge of the details of construction of the means for effecting the result reference is to be had to the following description and accompanying drawings.

While the essential and characteristic features of the invention are susceptible of modification, still the preferred embodiment of the invention is illustrated in the accompanying drawings, in which—

Figure 1 is a perspective view showing the application of the invention in practical use. Fig. 2 is a sectional view. Fig. 3 is a view in elevation, the bars of the stay being shown separated preparatory to being secured to the fence.

Corresponding and like parts are referred to in the following description and indicated in all the views of the drawings by the same reference characters.

In the drawings a line of fence is illustrated, the posts being designated 1, and the longitudinal fence-wires 2. The fence-stays, which comprise my invention, are designed to be disposed at intervals in the length of the longitudinal wires of the fence, being arranged at distances found most suitable for the purposes of the invention. Each of the stays, which are designated 3, is composed of corresponding bars $3^a$, secured together at their lower ends, as shown at 4, and having spaces therebetween at intervals in the length of the stay. The spaces between the bars $3^a$ of each stay are formed by providing protuberant portions $3^b$ in each of the bars $3^a$, which protuberant portions are in engagement with each other, or, in other words, in contact when the stay is in operative position. The protuberant portions $3^b$ of the bars $3^a$ are formed by crimping or corrugating the bars longitudinally thereof, and the crimped or corrugated portions are the portions which abut, so as to form the spaces at intervals in the length of the stay. The protuberant portions $3^b$ are disposed in the same relative plane when the bars $3^a$ are secured together, and the longitudinal wires 2 of the fence are received in the spaces or openings which are formed between the various protuberant portions which are in contact with each other.

The lower ends of the bars $3^a$ are secured together, as shown at 4, by twisting the bars together at the lower ends thereof, and the twisted portions 4 are inserted into the ground, so as to ground the electrical charges of lightning when the function of the stay as a lightning-arrester is being performed. The length of each stay is dependent upon the number of line-wires 2 of the fence, and it will be understood that the stays may be made in various lengths as found necessary. The bars $3^a$ of the stays are secured together with the protuberant portions thereof in contact with each other by means of light wires 5, which are wrapped about the stay-bars and about the adjacent portions of the line-wires, as shown most clearly in Fig. 1, of the drawings. The wires 5 are "tie-wires," in other words, and rigidly hold the stays 3 from any longitudinal movement along the line-wires 2. The upper ends of the bars 3 of each stay are given a half-twist and are turned about each other and project upwardly above the uppermost line-wire 2, as shown clearly.

The tie-wires 5 are preferably of copper, so that the stays will form perfect electrical conductors.

Having thus described the invention, what is claimed as new is—

In combination with the line-wires of a fence, a fence-stay comprising corresponding bars having their lower ends secured together, said bars being longitudinally crimped or corrugated to form protuberant portions, said protuberant portions being disposed in contact and forming spaces between the bars which receive the line-wires, and tie-wires wrapped about the bars of the stay and the line-wires to secure the stay to the line-wires, the upper ends of the bars of the stay being turned or twisted about each other.

In testimony whereof we affix our signatures in presence of two witnesses.

JOSEPH N. REYNOLDS. [L. S.]
JOHN C. JENKINS. [L. S.]

Witnesses:
H. C. FAULKNER,
C. E. FAULKNER.